US012368733B2

(12) United States Patent
Liburdi et al.

(10) Patent No.: US 12,368,733 B2
(45) Date of Patent: Jul. 22, 2025

(54) AUTOMATED ALERT DEDUPLICATION OR SUPPRESSION IN DATA PROCESSING SYSTEMS BASED ON RECURRING DATA IDENTIFIERS

(71) Applicant: Brex Inc., Draper, UT (US)

(72) Inventors: Joshua Liburdi, Santa Rosa, CA (US); Jessica Rozhin, Los Angeles, CA (US); Julie Agnes Sparks, Denver, CO (US)

(73) Assignee: Brex Inc., Drapher, UT (US)

( * ) Notice: Subject to any disclaimer, the term of this patent is extended or adjusted under 35 U.S.C. 154(b) by 224 days.

(21) Appl. No.: 18/334,637

(22) Filed: Jun. 14, 2023

(65) Prior Publication Data
US 2024/0422175 A1    Dec. 19, 2024

(51) Int. Cl.
*H04L 9/40* (2022.01)
(52) U.S. Cl.
CPC ...... *H04L 63/1416* (2013.01); *H04L 63/1425* (2013.01)
(58) Field of Classification Search
CPC .............. H04L 63/1416; H04L 63/1425
USPC ............................................. 726/23
See application file for complete search history.

(56) References Cited

U.S. PATENT DOCUMENTS

| | | | | |
|---|---|---|---|---|
| 7,930,746 | B1* | 4/2011 | Sheleheda | H04L 63/1416 713/153 |
| 9,632,857 | B2* | 4/2017 | Aranguren | G06F 11/0781 |
| 12,001,410 | B2* | 6/2024 | Madan | G06F 16/215 |
| 2017/0076095 | A1* | 3/2017 | Reddington | H04L 63/105 |
| 2020/0285737 | A1* | 9/2020 | Kraus | G06F 21/552 |
| 2023/0325498 | A1* | 10/2023 | Whalen | G06F 21/566 726/23 |
| 2024/0022533 | A1* | 1/2024 | Lawrence | H04L 51/212 |

* cited by examiner

*Primary Examiner* — Badri Narayanan Champakesan
(74) *Attorney, Agent, or Firm* — Perkins Coie LLP

(57) ABSTRACT

There are provided systems and methods for automated alert deduplication or suppression in data processing systems based on recurring data identifiers. An entity, such as company or business, may utilize computing services provided by a service provider. When providing these services, one or more computing services, processors, or the like of the service provider's computing architecture may be used. Use of computing services may generate security alerts when computing events are flagged as risky, fraudulent, malicious, computing attacks, or the like. To automate security alert management, the service provider may utilize an alert management system that may parse and extract data from incoming security alerts and calculate identifiers from such data, such as by transforming or converting using identifier functions. Recurring identifiers may be automatically organized for suppression or deduplication based on past occurrence of such identifiers with other security alerts.

18 Claims, 5 Drawing Sheets

AUTOMATED ALERT DEDUPLICATION OR SUPPRESSION IN DATA PROCESSING SYSTEMS BASED ON RECURRING DATA IDENTIFIERS

TECHNICAL FIELD

The present application generally relates to efficient management of security alerts in a computing system and more specifically to automatically suppressing or deduplicating security alerts in the computing system through unique data hashes and recurring past alert suppression and deduplication.

BACKGROUND

Service provider systems may provide services to customers, such as businesses and companies, through computing systems and networks. These computing systems and networks may also be utilized by internal users, where the systems generate, transmit, and process security event logs, system audit logs, and the like when processing data. As companies and other organizations scale, their internal and external usage of applications, components, and the like, such as for data processing through different data processors, microservices, decision services, and/or other computing resources, cause such systems to similarly scale and generate more computing events and logs, with corresponding security alerts based on occurring events. Thus, manual triage, investigation, and management of real-time alerts may become difficult if not impossible for all generated security alerts. This creates an alert system architecture that may be costly, as well as insufficient for the requirement of the organization and computing system. In order to operate efficiently, automatic security alert management may be required; however, current solutions for computing security management suffer from scaling of triage, investigation, and management.

Therefore, there is a need to address deficiencies with conventional computing systems and architectures used by service providers to manage computing events and security alerts in an efficient, reliable, and scalable manner.

Figure 1:
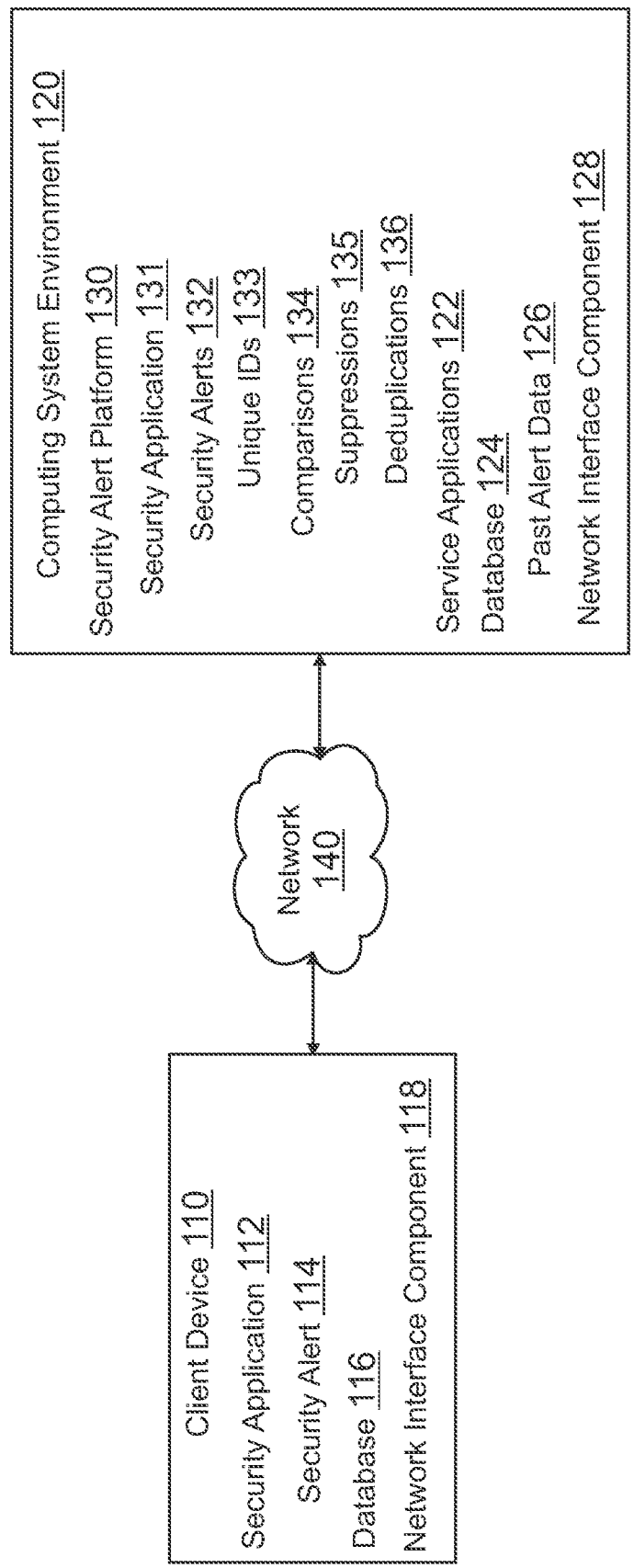
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for automated alert deduplication or suppression in data processing systems based on recurring data identifiers. Systems suitable for practicing methods of the present disclosure are also provided.

In service provider systems, a networked system and provider may include a computing framework and architecture to provide payment gateways, billing platforms, eCommerce platforms, invoicing, and additional services. These systems may include internal and/or external networks of devices and servers, which may be used when providing computing services, platforms, and applications to internal and/or external users. However, with large and complex computing architectures and infrastructures that provide these services, data and other computing security services are needed by the business, organization, or other service provider providing the computing architecture. As computing systems grow into larger architectures, having distributed systems, databases, and networks over many areas and end users, security teams and security services, such as detection and response teams, may become overwhelmed by the different security threats and alerts generated by computing events, activities, actions, and other computing log data generated by interactions and activities of internal and/or external users or entities. Thus, security operations for triage, investigation, management, and processing of alerts may be required to be sufficiently scalable, while efficient, reliable, and robust, to provide adequate computing security services to service provider computing architectures.

In order to solve these issues with server computing architectures, a service provider may implement an alert management system, application, and/or operations for security alerts to provide automatic security alert organization. The alert management system may further provide automated suppression and/or deduplication of security alerts when such alerts are seen multiple times, recurring, and/or repetitive. To provide this alert management, such as in real-time when a security alerts enter the service provider's computing system or other architecture and/or the security management system, the service provider may implement computing services in a serverless computing environment, such as a cloud computing environment (e.g., Amazon Web Services (AWS)). Serverless cloud computing allows a service provider to utilize and request allocation of computing resources dynamically for data processing jobs, such as by selecting, utilizing, or requesting processing of tasks by certain machine clusters, computes, or the like. These resources are specified by the customer, and the customer is charged for and/or provided allocated resources and run time for the data processing task being performed. Cloud computing architectures may provide high scalability and fast response times, and therefore scalable security applications, services, and operations may be required to scale with computing systems operating in serverless environments as such systems grow and scale accordingly. However, the alert management system may also be provided in server-based or other computing systems and/or networks.

In the serverless or other computing environment, the service provider may implement the security management system that obtains security alerts in real-time as such alerts enter the service provider's computing systems and/or architecture, such as when generated by an internal or external computing alert system. Once the alert is received, it may be parsed and a name and a payload corresponding to the alert may be extracted. The name and/or payload may be converted to different identifiers, such as through identifier calculation using a function, algorithm, hash operation, etc., which may be used to determine if the alert is recurring in the service provider's systems. The identifiers may be compared to those identifiers of past seen alerts, and an action may be considered for organizing the alert and further processing the alert. For example, where another past alert with the same or similar name was previously seen by a user and suppressed, the alert management system may suppress the new alert. In other embodiments, identifiers associated with a part or all of the payload, which may also include the name for further precise matching, in the new alert that are matched to other past alerts that are ongoing with the security alert system and therefore likely to be duplicated may be deduplicated to prevent or reduce the number of the same recurring alert during security alert processing and resolution. As such, the service provider may provide automated processes for suppression and deduplication of alerts, which can improve the functionality and efficiency of computer systems tasked with handling alerts by reducing computational processing and memory use.

In this regard, a service provider system may offer computing services, software, online resources and portals, and infrastructure to one or more customer entities (e.g., businesses or companies). The service provider may have a large and/or complex computing architecture that is used to provide these computing services to users. This computing architecture may also provide computing services to internal users of the service provider, such as employees, administrators, coders and developers, data scientists, executives, and other users that may utilize internal systems for communications, data review and processing, and implementation of the service provider's services to customers, end users, and other external entities. Such, implementation of computing services and use of those services may have resulting data that is received, generated, and/or processed by the service provider's computing system and architecture. In turn, to manage these systems and provide for security detection and alerting, a security system may be implemented that detects security issues and events occurring from computing events and their corresponding data logs. As discussed herein, such security system may also provide alert management to automate processes to suppress and/or deduplicate alerts when recurring, repetitive, and/or ongoing.

In more detail, the service provider may provide a computing infrastructure including a security system that includes an alert management system for security alerts. As computing events and computing data logs (e.g., network traffic, firewall, etc.) come into the system, security alerts and other events may be generated based on security rules, models, and the like (e.g., rule-based or AI systems, models, and engines that detect computing events indicating risk, attack, malicious or unauthorized conduct, system or data breach or compromise, etc.). For example, an alert may be due to a computing attack, unseen payload or request, malicious user or IP, or other computing event that may trigger a security alert based on a rule-base or artificial intelligence (AI)-based engine (including machine learning (ML) models and engines, neural networks (NN), and the like). As the security alerts enter the computing system and/or architecture, as well as the security and alert management system, the alerts may be parsed for data. A name (or title, identifier, or the like) and a payload (e.g., an alert body, subject, message, etc., that may identify the type of alert, cause, parties to the alert, devices or identifiers for the alert, etc.) may be determined from parsing the alert, data, message, name or identifier, and the like. Such data may then be extracted for processing.

Using the extracted data, the alert management system may calculate identifiers for use in determining whether the alert has been seen before by the data and computing system security team (and/or corresponding applications, platforms, and systems). The identifiers may further be used to determine whether the alert has been suppressed by one or more users, corresponds to an ongoing issue, and/or has been or requires deduplication. For example, the alert management system may calculate, using a universally unique identifier (UUID) formula, algorithm, or function, a UUID for the payload of the alert. The alert management system may further determine a unique name identifier, such as an alert identifier (AID), using a hashing algorithm, technique, and/or function, such as SHA256 hashing or similar, as well as a contextual alert identifier (CAID) using the same, similar, or different hash generation process (e.g., one or more hashing operations for hashing input data into data hashes). While the AID may be generated using the extracted name, the CAID may correspond to a unique contextual identifier for the security alert and may be based on the name with at least a portion of the payload or other information from the alert body (e.g., a user name or identifier that the alert was addressed to, a type of the alert, a cause of the alert, etc.). By hashing such data, unique identifiers may be generated to allow for direct comparisons and matching to other previously seen (or unseen if non-occurring in past data) alerts and corresponding unique identifiers.

The alert management system may then access a database other data storage, such as by retrieving database records and/or tables and/or querying the database, in order to identify whether the identifiers for the security alert have previously occurred, are recurring, and/or have corresponding suppression flags, deduplication flags or processes, and/or corresponding to the same ongoing issue requiring deduplication. In this regard, if the identifiers have no matches and/or have not previously been seen by the alert management system, the security alert may proceed and may be sent out to the user, security analyst or team member, administrator, or other party designated to receive the security alert. This allows such a user to review the alert, and then decide whether the alert is actionable, and what such action should be taken, to resolve the alert and/or computing event causing the alert. The user receiving the alert may also flag the alert for suppression and/or deduplication, such as if the alert is not important, faulty, has previously been seen and/or corresponds to the same or similar computing event, and the like. This allows for organization of the alert automatically later based on the security alert's identifiers and action take with such alert.

However, if one or more of the AID, CAID, and/or UUID match or correspond to identifiers previously seen by the security system and recorded or stored in the database for the security management system, then the security alert may be automatically organized, and action taken on such alert, corresponding to the previous actions or organization of the past security alerts and identifiers. Such organization may depend on either or both of the past organization and action for the past alerts and/or the past identifier(s) that was/were matched to the security alert's identifiers. For example, if an AID matches, and the previous security alert has been suppressed, the new security alert may also be suppressed based on the matching name and request by a user (which may be the same or different) to suppress such alerts with that name. If the CAID matches to an ongoing security event and/or alert issue, then the new security alert may be deduplicated in order to reduce incoming security alert traffic caused by the same computing event. Other matches may also cause different suppression and/or deduplication efforts in an automated manner for organization of such alerts without requiring user review of each individual security alert.

Thus, the security alert management system may provide automated operations in computing systems and architectures for organizing and taking action on security alerts automatically and based on recurring alerts, identifiers, and their correspond past data and suppression/deduplication actions. This allows for flexible and automated system that may reduce manual efforts and user review for security alert management. Further, the security management system may offload security alert processing requirements to an automated system that allows for scalability when computing systems and architectures grow in size and complexity. As such, computing systems may be provided with more efficient, faster, and reliable data security.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110 and a computing system environment 120 in communication over a network 140. A user (not shown) may correspond to an employee, administrator, developer, contractor, or other suitable person of a company (not shown and generally referred to herein as an "employee" or "user" associated with such a system) associated with computing system environment 120. The employee or other user may utilize the services provided by computing system environment 120 from a service provider through client device 110, including receiving and acting on security alerts, as well as having security alerts suppressed and/or deduplicated. Computing system environment 120 may process data with client device 110, such as during computing system use, login, communications, authentication, underwriting, account generation or usage, electronic transaction processing, expense management, or the like. In this regard, computing system environment 120 may provide security alert management operations to automatically organize, such as by suppressing and/or deduplicating, security alerts.

Client device 110 and computing system environment 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be utilized by an employee, security team member, security agent or expert, contractor, affiliate, or owner of an entity or company that employs one or more users, for example, to utilize and/or interact with computing services provided by computing system environment 120. For example, in one embodiment, client device 110 may be implemented as a personal computer (PC), telephonic device, a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. In this regard, client device 110 includes one or more processing applications which may be configured to interact with computing system environment 120. Although only one system endpoint is shown, a plurality of communication devices may function similarly.

Client device 110 of FIG. 1 includes a security application 112, a database 116, and a network interface component 118. Security application 112 may correspond to executable processes, procedures, and/or applications with associated hardware. In other embodiments, client device 110 may include additional or different modules having specialized hardware and/or software as required.

Security application 112 may be implemented as specialized hardware and/or software utilized by client device 110 to access and/or utilize services associated with computing system environment 120, such as internal and/or external users when engaging and/or maintaining computing services provided by a corresponding service provider. Such computing services of the service provider may be used for underwriting for credit, onboarding and/or management of an account, electronic transaction processing, and/or usage of other services. Further, security application 112 may be used to provide computing and data security services and operations to users, including viewing, managing, and taking action on security alerts for computing events occurring with computing system environment 120. As such, security application 112 may be used to receive security alerts, suppress or deduplicate such alerts, and/or manage tasks and alerts that may have been automatically suppressed or deduplicated by an alert management system provided by computing system environment 120.

These computing services may be provided by a service provider associated with computing system environment 120, which may be provided to an entity (e.g., an organization, business, company, or the like including startup companies that may require credit services). For example, a user associated with the entity may utilize such services to receive data and/or request data processing for data from computing system environment 120. Security application 112 may be used to receive, view, manage (e.g., organize, such as by suppressing, deduplicating, responding to, ignoring, etc.), and/or take further action on security alerts, which may be generated by a data and computing services security system and/or applications of computing system environment 120 based on computing events and corresponding logs occurring from internal and/or external use of the computing services provided by computing system environment 120. In this regard, security application 112 may correspond to software, hardware, and data utilized by a user associated with client device 110 to receive security alerts, which may cause a user to organize by taking an action to resolve, or instead suppressing, deduplicating, deleting, ignoring, or otherwise resolving the security alert with or with affecting or responding to the corresponding computing event causing the alert. Security alert 114 may correspond to such an alert delivered to client device 110 based on a computing event that occurred and caused a corresponding security rule, model, system, or the like to trigger and/or generate security alert 114 (e.g., as data and the computing event enter computing system environment 120). Thus, security alert 114 may be provided to client device 110 for organization and/or action. However, other security alerts may be automatically organized and not appear, be hidden from, and/or suppressed from security application 112 based on a security management system provided by computing system environment 120, as further discussed herein. Such security alerts may be associated with financial processing, underwriting, and the like. In other embodiments, the computing services provided by computing system environment 120 and/or associated with security alert 114 may further include email and messaging, social networking, microblogging, media sharing and/or viewing, streaming, and/or other data processing services.

In various embodiments, security application 112 may include a general browser application configured to retrieve, present, and communicate information over the Internet (e.g., utilize resources on the World Wide Web) or a private network. For example, security application 112 may correspond to a web browser, which may send and receive information over network 140, including retrieving website information, presenting the website information to the user, and/or communicating information to the website, including payment information. However, in other embodiments, security application 112 may include a dedicated software application of computing system environment 120 or other entity. Although security application 112 is discussed with regard to receiving, viewing, managing, and/or taking action on security alerts, security application 112 may also be configured and/or utilized to assist in onboarding for accounts, establishing and maintaining the accounts, engaging in electronic transaction processing, and/or otherwise engaging in computing services provided by computing system environment 120.

Client device 110 may further include database 116 stored in a transitory and/or non-transitory memory of client device 110, which may store various applications and data and be utilized during execution of various modules of client device 110. Database 116 may include, for example, identifiers such as operating system registry entries, cookies associated with security application 112, identifiers associated with hardware of client device 110, or other appropriate identifiers, such as identifiers, tokens, and/or fingerprints for devices, applications, accounts, and/or users. Database 116 may further include security alert 114 and the like, which may be delivered, automatically or on command, from computing system environment 120 based on a security management system.

Client device 110 includes at least one network interface component 118 adapted to communicate with computing system environment 120 and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices.

Computing system environment 120 may be maintained, for example, by an online service provider, which may provide services for account creation and onboarding, credit or loan underwriting services, payment and transaction processing services, expense management services to companies, businesses, and other entities, and/or other computing services, which may include data, computing, and digital security services associated with providing such computing services. In this regard, computing system environment 120 includes one or more processing applications which may be configured to interact with client device 110 and other devices or servers to facilitate provision of data, computing, and digital security services. In one example, computing system environment 120 may be provided by BREX®, Inc. of San Francisco, CA, USA. However, in other embodiments, computing system environment 120 may be maintained by or include other types of credit providers, financial services providers, and/or other service providers, which may provide services to users and entities.

Computing system environment 120 of FIG. 1 includes service applications 122, a security alert platform 130, a database 124, and a network interface component 128. Service applications 122 and security alert platform 130 may correspond to executable processes, procedures, and/or applications with associated hardware. In other embodiments, computing system environment 120 may include additional or different modules having specialized hardware and/or software as required.

Service applications 122 may correspond to specialized hardware and/or software to allow entities (e.g., the entity associated with client device 110) to provide computing services to external users, entities, and the like, which may include account services, provide credit or loan extensions via underwriting models and/or services, process payments and transactions using one or more payment cards or other financial instruments, provide expense management systems, and/or provide additional services. Such services provided by service application 122 may also be provided, maintained, and supported by internal systems, computing infrastructure, applications, and internal users or teams (including security teams) for computing system environment 120. Thus, service applications 122 may correspond to one or more services provided by, in, and/or is association with computing system environment 120 to an entity, which may include use, maintenance, and/or engagement by internal users, teams, and entities (as well as external where third-party users, contractors, systems, and the like). In some embodiments, the services may include account and/or credit services where service applications 122 may include underwriting systems and models, which may extend credit or other loans based on parameters for an entity. Using the accounts and/or credit, electronic transaction processing services may also be provided to users and entities via service applications 122. In further embodiments, service applications 122 may provide expense management services, such as those that may integrate with an entity's expense, payroll, human resources, business panning, and the like to provide enterprise resource planning (ERP) services. Service applications 122 may be provided in different server or serverless computing environment.

In some embodiments, the services may be used to receive payment instruments associated with a bank account, extended credit, and/or funding of the company, such as one or more company credit cards. In this regard, an entity may first establish an account with service applications 122 by providing company or entity data and onboarding through service applications 122. The company or entity data may include IRS EIN information and/or other information that may be utilized to verify a company, business, organization, or other entity. Such information may further include bank account and funding information, such as verified funding from investors, available funds in a bank or financial account, and the like. If qualified based on policies, rules, and/or models, computing system environment 120 may onboard the entity associated with client device 110 for services provided by computing system environment 120. This may include credit extended to the entity based on entity financial data. In this regard, computing system environment 120 and/or another issuing entity may provide a payment instrument that is managed by service applications 122. For example, computing system environment 120 may issue one or more credit cards for employees of the entity, which may correspond to a real or virtual credit card or other types of payment instruments and instrument identifiers that may be used for company payments.

During use of service applications 122, one or more computing events may trigger or cause generation of security alerts, such as security alert 114 issued to client device 110 for alerting and/or resolution of an issue, attack, error, or other computing activity that requires alerting and/or resolution. Service applications 122 may receive and/or generate security alert 114 for client device 110, which may be based on a corresponding computing event from use of the computing services provided through service applications 122. Where such data may include event, traffic, and/or security logs, service applications 122 may provide such logs from corresponding events that occur with the service provider, and security alerts (e.g., security alert 114) may be generated, issued, and/or transmitted to and/or for use by one or more endpoints (e.g., client device 110 and/or other devices, servers, address, identifiers, or the like used by users to receive, view, and/or act on such security alerts). Security alerts may be issued in real-time or near real-time when the computing event occurs and/or at a later time after processing event log data and/or performing system and/or log review, where security alert platform 130 may receive and process the security alerts as such alerts are generated and/or enter a corresponding security and/or alert management system for review, organization, and/or delivery.

Service applications 122 may further be used to provide financial services and electronic transaction processing computing services to users, such as to process transactions. In this regard, service applications 122 may utilize one or more payment networks to process a transaction, such as by issuing a payment over a payment network and/or by requesting payment by a credit issuing bank or institution to the merchant and/or acquiring bank or institution. In other embodiments, the credit card and payment network may be managed by another entity and/or payment network, where an integration by computing system environment 120 with the network may allow for acquisition of transaction data by service applications 122 in real-time or substantially in real-time. Service applications 122 may further issue transaction histories for security alert 114 and provide accounting and recordation of transaction data, such as with the ERP resources provided by service applications 122.

Service applications 122 may include computing services that correspond to one or more data processing stacks, components, processors, microservices, and/or decision services of a service provider to provide these services utilized by client device 110 and/or other devices or servers. The computing services may correspond to different computing systems and/or processors of the service provider that may provide a data processing service and/or operation for data that is delivered to client device 110. For example, the computing services may be associated with login, authentication, transaction processing, verification, risk and/or fraud detection, payment networks and/or ACHs, and the like. Use of computing services by internal and/or external users may create logs, such as security logs and/or system audit logs. Thus, security alert platform 130 may be invoked in order to process received and/or generated logs and other data that is delivered to client device 110, such as by organizing security alerts according to identifiers.

Security alert platform 130 may correspond to specialized hardware and/or software to allow end users, security users and/or teams, administrators, engineers, compliance officers, security contractors, and other users associated with computing system environment 120 to receive, process, and deliver security alerts from computing events and logs generated during use of service applications 122 through different servers, devices, systems, databases, or the like including client device 110. In some embodiments, security alert management may include suppression, deduplication, and/or delivery of security alerts created in a serverless or cloud environment provided by computing system environment 120. Security alert platform 130 may execute a security application 131 that generates security alerts 132 when computing events and/or corresponding event logs cause security rules, models, NNs, or the like to detect a security condition or event (e.g., fraud, data breach, computing attack, malicious or suspicious conduct, etc.). Security alerts 132 may include security alert 114 issued to client device 110 and other security alerts that may be suppressed, deduplicated, and/or delivered to the same or other endpoints. As security alerts 132 are generated and/or enter computing system environment 120, security alerts 132 are parsed and data is extracted that enables the alert to be identified, such as an alert name and/or payload (e.g., message, sender/recipient, identified parties, identified logs or computing events, timestamps, and/or alert metadata). In some embodiments, security application 131 may correspond to a microservice that may correspond to a combination of standalone and integrated services.

Thereafter, unique identifiers (IDs) 133 may be generated by utilizing an identifier generation function or operation (e.g., the UUID function), as well as hashing algorithms (e.g., the SHA256 algorithm). For example, a UUID may be generated for a payload, an AID for an alert name, and a CAID for the alert name with at least another portion of the payload or other alert data that is more specific to the particular alert (thereby allowing for direct identification of matching security alerts and deduplication of repetitive alerts). Comparisons 134 may be performed using unique IDs 133 with past alert data 126, such as by searching, querying, and/or comparing identifiers (e.g., the UUID, AID, CAID, etc.) in each dataset. Where AIDs may be matched to past alerts and those alerts have been suppressed, suppressions 135 may be performed to further suppress the new alerts, reducing security alert volume to the same or other users based on past alert suppressions. Similarly, where CAIDs may be matched, deduplications 136 may be performed to deduplicate matching or the same security alert when such alert repeats and is issued for an ongoing computing and/or security event or issue. The operations and features of security alert platform 130 for performing security alert management and organization (e.g., suppression, deduplication, and/or delivery) are described in further detail with regard to FIGS. 2-4 below.

Additionally, computing system environment 120 includes database 124. As previously discussed, the user, entity, and/or entity may establish one or more accounts with computing system environment 120. Account data stored by database 124 may include customer credit accounts and other entity information, such as name, address, entity organization and/or formational information (e.g., incorporation, tax, and/or good standing documents), funding information (e.g., bank balances and/or incoming funding), additional user financial information, and/or other desired entity data. Further, database 124 may also include past alert data 126 for past security alerts generated, issued, and/or acted on by users for corresponding computing events, as well as such identifiers generated from parsing and extracting alert data from the security alerts. As such, database 124 may store past alert data 126 including one or more data tables with identifiers allowing for quick searching and locating of matching or similar past security alerts. Using past alert data 126, new security alerts may be suppressed, deduplicated, and/or delivered in an efficient and automated manner with less wasted resources for recurring alerts and alert identifiers.

In various embodiments, computing system environment 120 includes at least one network interface component 128 adapted to communicate with client device 110 and/or other devices or servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices.

In various embodiments, one or more of the devices, systems, and/or components of system 100 may access and/or utilize one or more computing systems or architectures of a banking or financial institution that may provide data processed by computing system environment 120. For example, the financial institutions may include a computing system and/or network utilized for funding balances within accounts, such as bank and/or financial accounts of funds available to business entities. The financial institution(s) may further provide resolution of payment requests and electronic transaction processing, which may be governed by permissions (e.g., acceptances and denials) of payment requests for transaction processing by computing system environment 120. In this regard, the financial institution(s) may provide one or more accounts that include balances available to an entity, such as bank accounts and other accounts that include assets of the business entity. A financial institution may correspond to an acquiring and/or issuing bank or entity that may hold accounts for users and/or assist in resolving payments.

Network 140 may be implemented as a single network or a combination of multiple networks. For example, in various embodiments, network 140 may include the Internet or one or more intranets, landline networks, wireless networks, and/or other appropriate types of networks. Network 140 may correspond to small scale communication networks, such as a private or local area network, or a larger scale network, such as a wide area network or the Internet, accessible by the various components of system 100.

Figure 2:
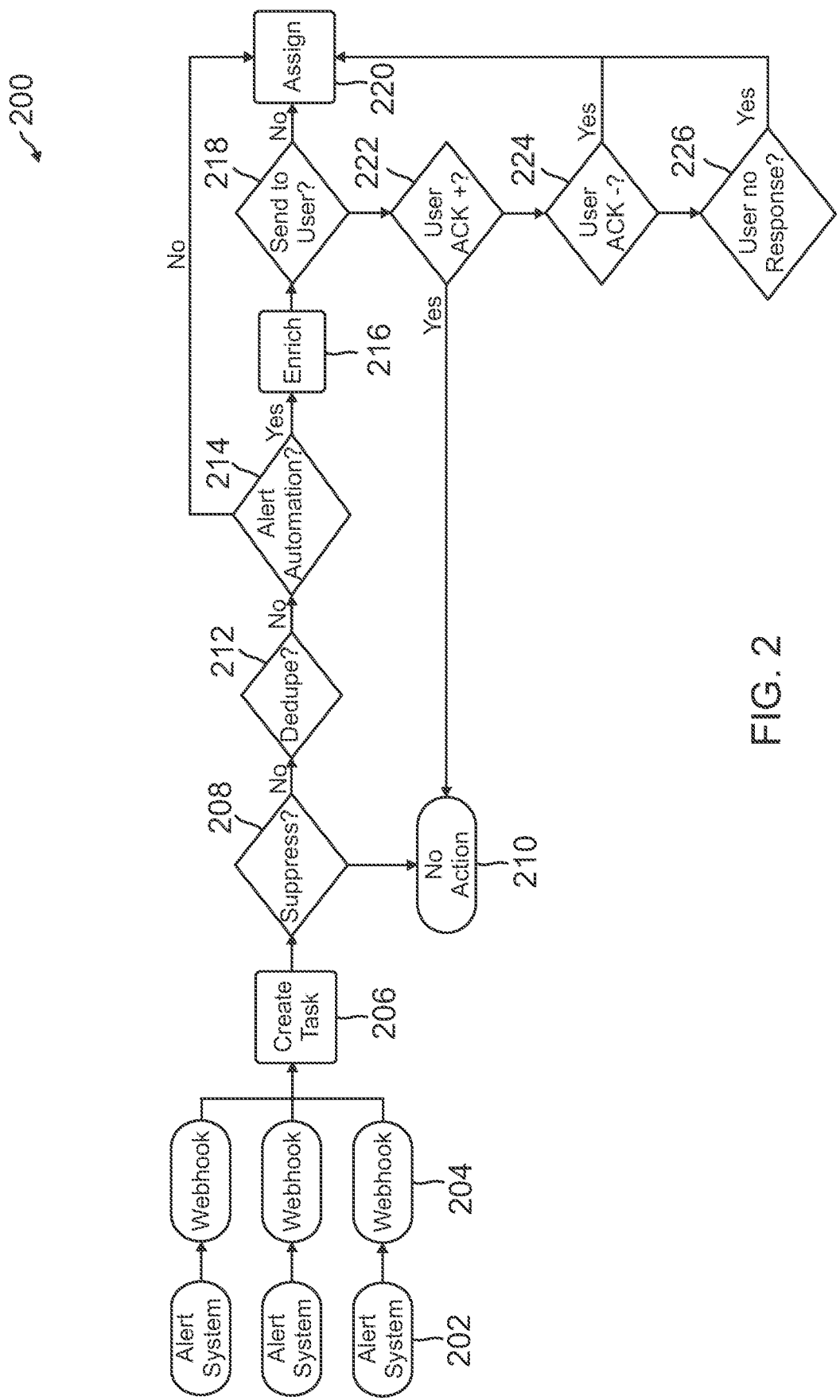
FIG. 2 is an exemplary diagram of operations executed by an application and/or security system for automatic deduplication or suppression of recurring security alerts, according to an embodiment.

FIG. 2 is an exemplary diagram 200 of operations executed by an application and/or security system for automatic deduplication or suppression of recurring security alerts, according to an embodiment. Diagram 200 of FIG. 2 includes a representation of security alert processing operations for security alerts prior to delivery to endpoints or suppression/deduplication by computing system environment 120 using security alert platform 130 discussed in reference to system 100 of FIG. 1. In this regard, diagram 200 may be executed by security alert platform 130 in a computing environment that automatically organizes security alerts to reduce alert volume to end users based on alerts that may be suppressed or deduplicated.

In diagram 200, an overview is shown of a system that processes security alerts to suppress, deduplicate, and/or deliver those security alerts to system endpoints and users. An alert system 202 is initially invoked and utilized with computing events and logs in order to identify security alerts caused by security rules, models, or the like and triggering of security conditions or events from such logs and other live, streamed, or available data. Data may be ingested via webhooks 204 (as well as HTTP), which may correspond to webhooks in a source system for security alerts that allows for ingestion of security alerts, event logs, and the like. A task 206 is created, such as in a tracking software application and/or system, that allows for management of security alerts and automatic organization of such alerts. This task may further parse and extract data, which may be used to calculate or otherwise determine identifiers for search of past security alerts.

After performing a database lookup and/or query for past matching identifiers to the new incoming security alert, diagram 200 shows additional processes that may be performed to automatically organize the security alert. First, a suppress decision 208 is determined based on whether the security alert has been suppressed or should be suppressed based on the same or similarly named alerts having been suppressed in the past. If suppressed or if designated to be suppressed at suppress decision 208 based on suppression of past alerts with matching names, diagram 200 continues to a no action or end state 210. However, if the alert has not been suppressed or designated for suppression, diagram 200 continues to dedupe (or deduplication) decision 212. Dedupe decision 212 may be based on whether a contextual identifier, such as based at least in part on the payload of the security alert, has been seen before and occurs in the security and alert management system. If yes, again diagram 200 continues to no action or end state 210.

However, if no to dedupe decision 212, diagram 200 continues to alert automation 214, where it is determined whether any automation may be provided to security alert processing for the security alert. If yes, diagram 200 continues to an enrich phase 216 to enrich the security alert, such as by adding context to the security alert or providing further information from past known security alerts or if the security alert and/or corresponding computing event is new. At a send to user decision 218, if it is decided that the alert should be assigned to a user or entity, such as a security team member, diagram 200 may proceed to an assignment 220 of the security alert. Further, if alert automation decision 214 results in a no, diagram 200 may proceed directly to assignment 220 for a security team member. However, if the security alert is flagged to send to a user, then a positive user acknowledge decision 222 is processed. If yes and a positive acknowledgement is received, diagram 200 returns to no action or end state 210. However, if no, a negative user acknowledgement decision 224 is processed. If a negative acknowledgement is received, diagram 200 proceeds to assignment 220. However, if not, a no user response decision is processed to determine, if yes, whether to proceed to assignment 220.

Figure 3:
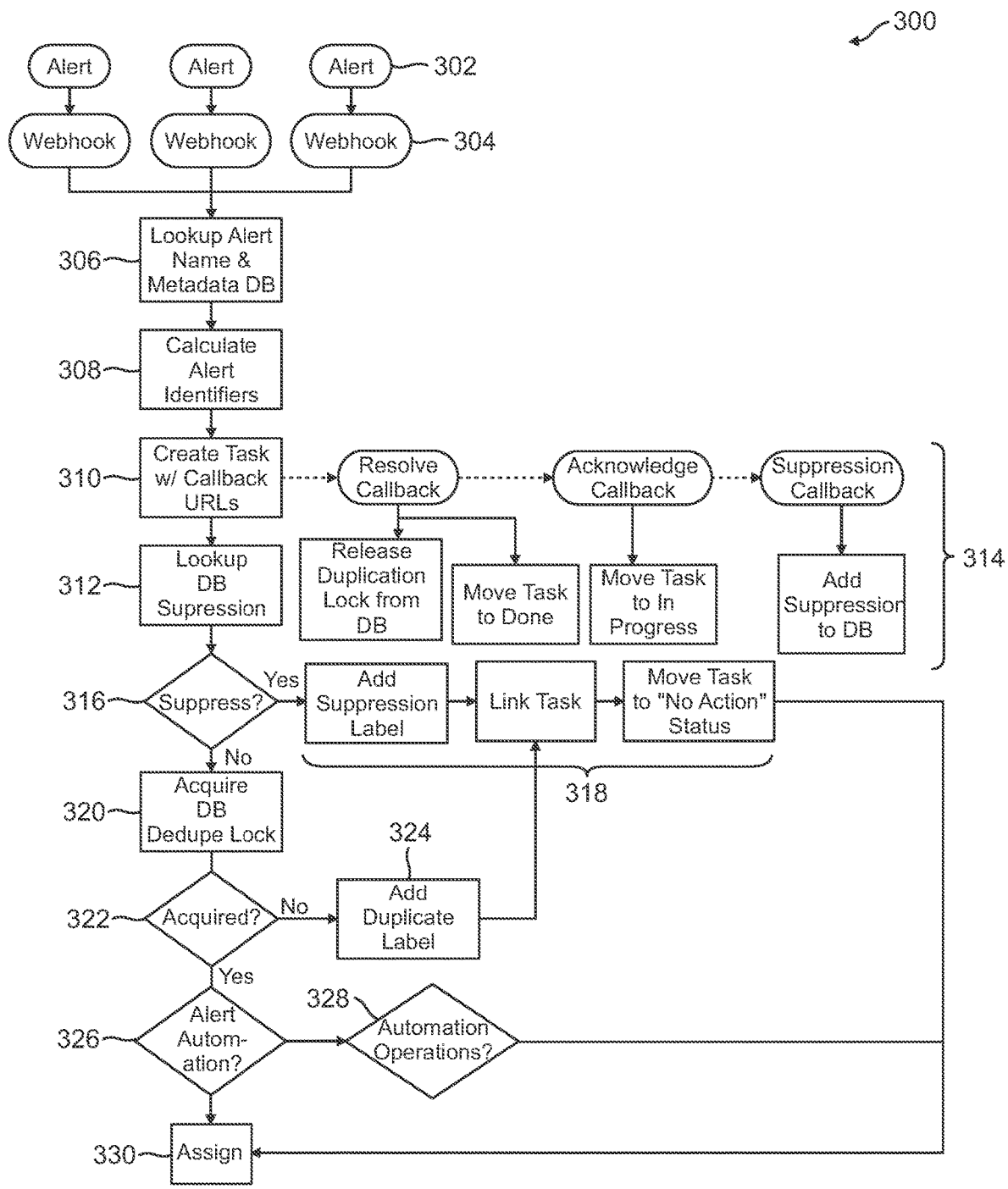
FIG. 3 is an exemplary diagram of additional operations executed by the application and/or security system discussed in FIG. 2 for automatic deduplication or suppression of recurring security alerts, according to an embodiment.

FIG. 3 is an exemplary diagram 300 of additional operations executed by the application and/or security system discussed in FIG. 2 for automatic deduplication or suppression of recurring security alerts, according to an embodiment. Diagram 300 includes operations performed in order to process security alerts automatically to provide scalability and efficiency in security alert handling by computing systems, such as computing system environment 120 in system 100 of FIG. 1. Thus, the operations for automated alert organization and/or management shown in diagram 300 may correspond to more granular operations for suppression, deduplication, and/or delivery of security alerts discussed in reference to diagram 200 of FIG. 2 that are executed security alert platform 130 in computing system environment 120 of system 100.

In diagram 300, a more detailed flow of the operations and components used for automatically suppressing, deduplicating, or otherwise organizing security alerts according to diagram 200 is shown. For example, similar to diagram 200, in diagram 300, alerts 302 may come in from various alert systems based on computing activities, logs, and the like, which are received, intercepted, and/or streamed using webhooks 304. A database lookup 306 may be used to determine any alert name and/or metadata for the security alert. Further, prior to an alert identifier calculation 308, parsing and/or extracting of the name and/or other payload data or metadata for the alert may be performed. This allows alert identifier calculation 308 to calculate an AID, CAID, and/or UUID using one or more functions or algorithms, such as a UUID function or hashing algorithm (e.g., SHA256 or similar). Unique identifiers from alert identifier calculation 308 may include those generated from a name, payload, metadata, and/or other information associated with the security alert.

Using the unique identifiers from alert identifier calculation 308, a task 310 with callback uniform resource locators (URLs) is generated, such as a Jira task or other task in a similar issue tracking application or platform. This may later be resolved through callbacks using the URLs, which may be acknowledged and suppressed through task processing 316. Using the unique identifiers, such as an AID, a database lookup 312 may be performed for the matching or similar identifiers for alerts that have been suppressed. This suppression query or lookup for past security alerts may indicate if other past security alerts having the same name or other identifier have been suppressed. If a suppression determination 316 results in a yes, diagram 300 proceeds to suppression operations 318 to add a suppression label, link a task for review of the security label, and move the task to a "no action" status.

If suppression determine 316 results in a no, diagram 300 proceeds instead to acquiring a database dedupe lock 320, such as a mutex lock that may assist in avoiding a race condition between multiple alerts. This may allow self-management of alerts within a system. If no lock is obtained, diagram 300 proceeds to deduplicating the security alert and adds a dedupe label 324 to the security alert, thereafter, returning to link a task and mode the task to a "no action" status. However, if database dedupe lock 320 is obtained, diagram 300 proceeds to 326 to determine if the security alert is set up for alert automation 326. If yes, then automation processes 328 may proceed, as discussed with regard to diagram 200. However, if not, then diagram 300 proceeds to an assignment 330 to a security personnel, team member, or other user.

Figure 4:
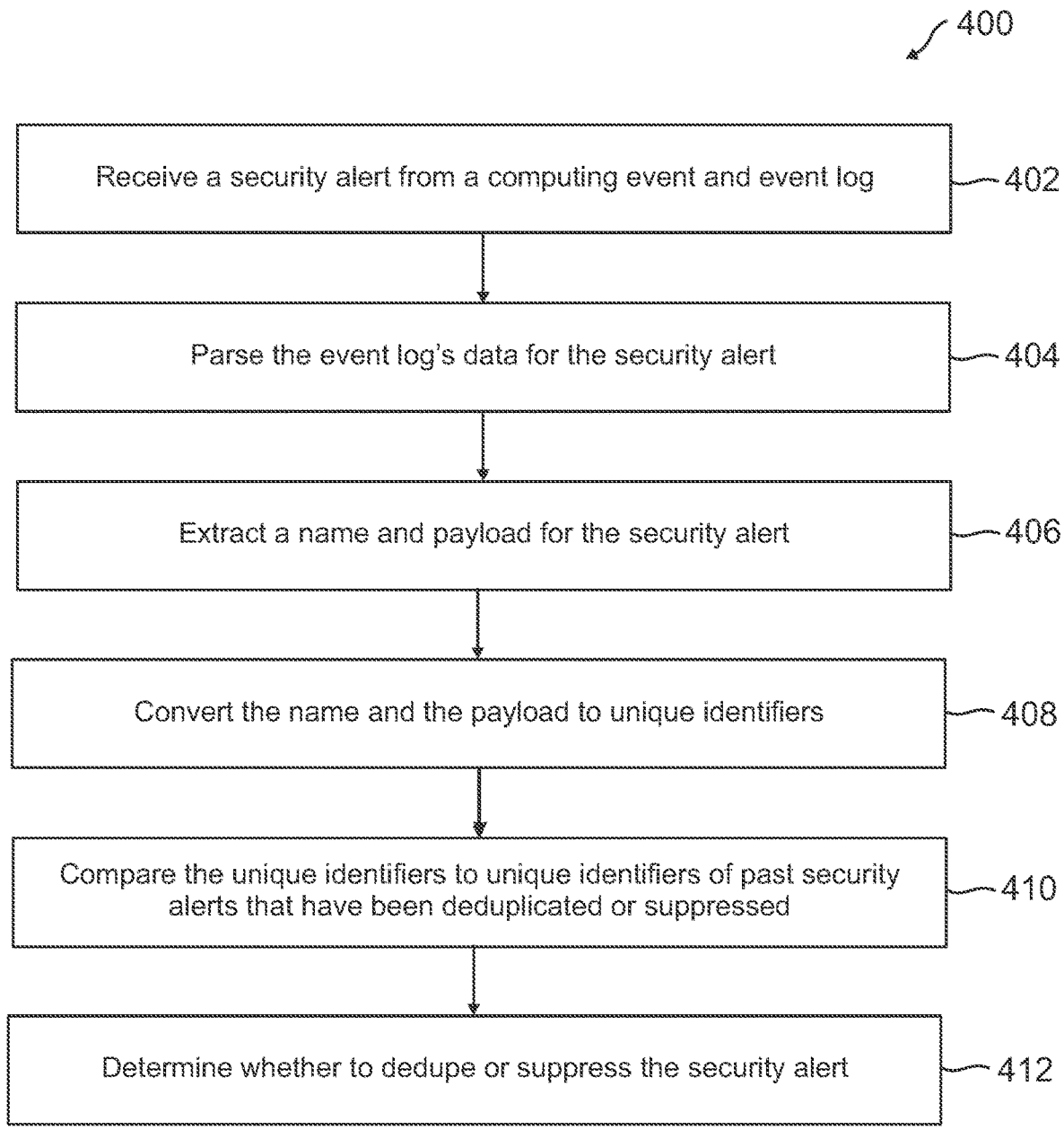
FIG. 4 is an exemplary flowchart for automated alert deduplication or suppression in data processing systems based on recurring data identifiers, according to an embodiment.

FIG. 4 is an exemplary flowchart 400 for automated alert deduplication or suppression in data processing systems based on recurring data identifiers, according to an embodiment. Note that one or more steps, processes, and methods of flowchart 400 described herein may be omitted, performed in a different sequence, or combined as desired or appropriate.

At step 402 of flowchart 400, a security alert for a computing event and event log is received. The security alert may be generated from data associated with a data processing flow, platform, application, activity, or the like, e.g., for an authentication or login, that is flagged and/or causes a security alert or condition to trigger, such as based on a computing event. In this regard, the data may correspond to logs and/or log files having recorded events and the like. Logs may include security event logs, system audit logs, and the like that are used for system security and security auditing by different endpoints and require security alerts when such data triggers a security rule, model, or the like.

At step 404, the event log's data for the security alert is parsed. The computing event causing a security condition and/or event may have the corresponding event log having information associated with the event, systems, users, and/or activities involved in causing the security alert. Such data may be parsed to determine the contents of the data. At step 406, a name and payload for the security alert are extracted (and/or other data that may be extracted that sufficiently identifies the security alert). Based on the parsing, an identifier, text, or other alphanumeric characters, symbols, and/or data may be determined for the name of the security alert, such as an identifier that is used to classify or describe the alert. Further, the alert may have a payload, such as a message, designated endpoints for receipt of the alert, user in the alert, activities causing the alert, and the like. Such data may be extracted after being parsed from the security alert and the corresponding event logs.

At step 408, the name and the payload (or other data) are converted to unique identifiers, such as by calculating or transforming using the characters, digits, or other data for the name and the in the payload. The conversion may be through calculation (e.g., using an identifier calculation function, hashing algorithm, etc.) of the identifiers from the data for the name and/or payload extracted from the security message, or otherwise transforming the data into unique identifiers that unique identify the name of the security alert and/or contextual information for the security alert. For example, an AID may be generated for the name of the security alert, which uniquely identifies that security alert by name and allows for determination of when the same or similar past alerts have been sent having the same name, such as "data breach," "fraud transaction," or other type of alert. This allows for muting of alerts specifically by name and/or name type, which may be done by suppressing such an alert and thereby suppressing that alert's name in future security alerts.

Further, a CAID may be generated by using the name and at least a portion of the payload to generate a unique identifier that is contextually related to the alert and specific to that alert. This allows for deduplication of repetitive alerts that have the same name and payload (or at least a portion of the payload). Additional unique identifiers may include UUIDs for payloads and the like that may use all or a part of either or both of the name or payload for the security alert. The calculation of the AID, CAID, UUID, and/or other unique identifier may also be dynamic and/or based on the name and/or payload of the security alert and/or other names and payloads of different security alerts. This security alert calculation may be performed for the security alert when the computing event and/or security alert enters the system for review, such as the security system, alert management system, and/or overall computing system and architecture for the service provider.

At step 410, the unique identifiers are compared to unique identifiers of past security alerts that have been deduplicated or suppressed. A database for past security alert may be accessed and records retrieved or queried to determine if those past security alerts have the same or matching unique identifiers. At step 412, it is determined whether to deduplicate or suppress the security alert. This may correspond to automatically organizing the security alert with users and a security and alert management system, such as by suppressing or deduplicating security alerts based on recurring identifiers for such alerts, which reduces security alert volume when security alerts have been requested to be suppressed or correspond to an ongoing security event and are duplicated or repeated. Thus, suppressing an alert may occur when a unique name identifier (e.g., AID) reoccurs for a previously seen and suppressed security alert. Suppression of the new alert may be performed through an operation and may mute the security alert from appearing, being output, or flagging with a security alert system in a user interface provided on a user endpoint associated with the security system, service provider's computing architecture, or the like. Deduplicating an alert may occur when a unique contextual identifier (e.g., a CAID) recurs and has been seen in an ongoing security issue or event. Deduplication of the new alert may be performed through an operation and may hide or remove of the security alert with the security alert system.

Further, a context to the organizing may also be provided, such as why the particular security alert has been suppressed and/or deduplicated. This may be based on the actions taken with the previous security alerts and/or ongoing security alerts, such as by linking the new security alert to other past security alerts that have been suppressed or deduplication or to ongoing security alerts when deduplicating repetitive security alerts. Additionally, at a time after the security review of the security alert and/or computing event, a review task and/or job may be created to review the security alert and the suppression, deduplication, or the like of the security alert based on the decision for organizing the security alert.

Figure 5:
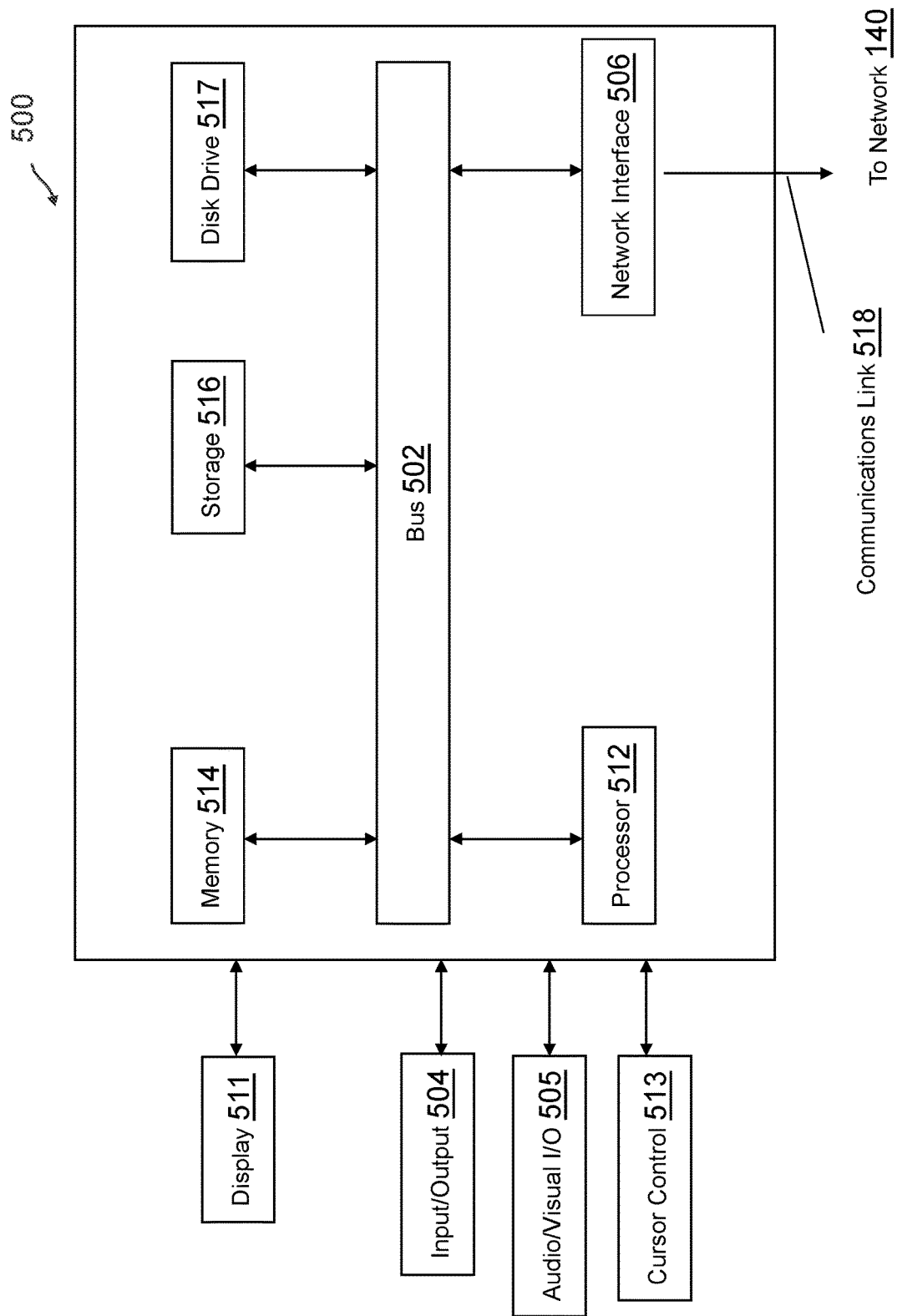
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving a security alert corresponding to a computing event that involves a computing architecture corresponding to a service provider;
parsing data for the security alert;
extracting, based on parsed data, a name and a payload of the security alert;
determining a unique name identifier and a unique contextual identifier from the name and the payload using at least one identifier calculation function, wherein calculation of the unique name identifier and the unique contextual identifier is dynamic and based on the payload of the security alert and a plurality of other payloads for different security alerts;
comparing, from an event log database corresponding to computing logs associated with a plurality of computing events including the computing event, the unique name identifier and the unique contextual identifier to respective past unique name identifiers and past unique contextual identifiers that have previously been suppressed or correspond to an ongoing security event; and
automatically organizing, in real time, the security alert based on the comparing, wherein the automatically organizing comprises determining whether to execute a deduplication operation or a suppression operation for the security alert.

2. The system of claim 1, wherein the suppression operation mutes the security alert from appearing, being output, or flagging with a security alert system in a user interface provided on a user endpoint associated with the computing architecture, and wherein the operations further comprise:
executing the suppression operation based on the automatically organizing.

3. The system of claim 1, wherein the deduplication operation performs one of hiding or removing the security alert with a security alert system for the computing architecture, and wherein the operations further comprise:
executing the deduplication operation based on the automatically organizing.

4. The system of claim 1, wherein the determining comprises hashing, using a hashing algorithm corresponding to the at least one identifier calculation function, the name and the payload, and wherein the unique name identifier comprise a first hash of the name, and wherein the unique contextual identifier comprises a second hash of the name with at least a portion of the payload.

5. The system of claim 4, wherein the comparing comprises determining whether the first hash or the second hash matches at least one stored hash for the past unique name identifiers and the past unique contextual identifiers in the event log database.

6. The system of claim 1, wherein the operations further comprise:
providing a context with the security alert, wherein the context is based on at least one linked security alert from the comparing.

7. A system comprising:
a non-transitory memory; and
one or more hardware processors coupled to the non-transitory memory and configured to read instructions from the non-transitory memory to cause the system to perform operations comprising:
receiving a security alert corresponding to a computing event that involves a computing architecture corresponding to a service provider;
parsing data for the security alert;
extracting, based on parsed data, a name and a payload of the security alert;
determining a unique name identifier and a unique contextual identifier from the name and the payload using at least one identifier calculation function, wherein the determining is performed for the security alert when the computing event enters the system;
comparing, from an event log database corresponding to computing logs associated with a plurality of computing events including the computing event, the unique name identifier and the unique contextual identifier to respective past unique name identifiers and past unique contextual identifiers that have previously been suppressed or correspond to an ongoing security event;
automatically organizing, in real time, the security alert based on the comparing, wherein the automatically organizing comprises determining whether to execute a deduplication operation or a suppression operation for the security alert; and
creating, at a time after the computing event is received, a review task for the security alert based on whether the automatically organizing includes executing the deduplication operation or the suppression operation.

8. A method comprising:
receiving a security alert corresponding to a computing event that involves a computing architecture corresponding to a service provider;
parsing data for the security alert;
extracting, based on parsed data, a name and a payload of the security alert;
calculating a unique name identifier and a unique contextual identifier from the name and the payload using at least one identifier calculation function, wherein the calculating is dynamic and based on the payload of the security alert and a plurality of other payloads for different security alerts;

comparing, from an event log database corresponding to computing logs associated with a plurality of computing events including the computing event, the unique name identifier and the unique contextual identifier to past unique name identifiers and past unique contextual identifiers that have previously been suppressed or correspond to an ongoing security event; and automatically organizing, in real time, the security alert based on the comparing, wherein the automatically organizing comprises determining whether to execute a deduplication operation or a suppression operation for the security alert.

9. The method of claim 8, wherein the suppression operation mutes the security alert from appearing, being output, or flagging with a security alert system in a user interface provided on a user endpoint associated with the computing architecture, and wherein the method further comprises:

executing the suppression operation based on the automatically organizing.

10. The method of claim 8, wherein the deduplication operation performs one of hiding or removing of the security alert with a security alert system for the computing architecture, and wherein the method further comprises:

executing the deduplication operation based on the automatically organizing.

11. The method of claim 8, wherein the calculating comprises hashing, using a hashing algorithm corresponding to the at least one identifier calculation function, the name and the payload, and wherein the unique name identifier comprise a first hash of the name, and wherein the unique contextual identifier comprises a second hash of the name with at least a portion of the payload.

12. The method of claim 11, wherein the comparing comprises determining whether the first hash or the second hash match at least one stored hash for the past unique name identifiers and past unique contextual identifiers in the event log database.

13. The method of claim 8, further comprising:

providing, based on the automatically organizing, a context with the security alert, wherein the context is based on at least one linked security alert from the comparing.

14. The method of claim 8, wherein the calculating is performed, by a system, for the security alert when the computing event enters the system, and wherein the method further comprises:

creating, at a time after the computing event is received, a review task for the security alert based on whether the automatically organizing includes executing the deduplication operation or the suppression operation.

15. A non-transitory machine-readable medium having stored thereon machine-readable instructions executable to cause a machine to perform operations comprising:

receiving a security alert corresponding to a computing event that involves a computing architecture corresponding to a service provider;

parsing data for the security alert;

extracting, based on parsed data, information for the security alert;

calculating a unique name identifier and a unique contextual identifier from the information using at least one identifier calculation function, wherein the calculating is dynamic and based on the information extracted for the security alert and other information extracted for different security alerts;

comparing, from an event log database corresponding to computing logs associated with a plurality of computing events including the computing event, the unique name identifier and the unique contextual identifier to past unique name identifiers and past unique contextual identifiers that have previously been suppressed or correspond to an ongoing security event; and automatically organizing, in real time, the security alert based on the comparing, wherein the automatically organizing comprises determining whether to execute a deduplication operation or a suppression operation for the security alert.

16. The non-transitory machine-readable medium of claim 15, wherein the suppression operation mutes the security alert from appearing, being output, or flagging with a security alert system in a user interface provided on a user endpoint associated with the computing architecture, and wherein the operations further comprise:

executing the suppression operation based on the automatically organizing.

17. The non-transitory machine-readable medium of claim 15, wherein the deduplication operation performs one of hiding or removing of the security alert with a security alert system for the computing architecture, and wherein the operations further comprise:

executing the deduplication operation based on the automatically organizing.

18. The non-transitory machine-readable medium of claim 15, wherein the information comprises a name and a payload of the security alert, wherein the calculating comprises hashing, using a hashing algorithm corresponding to the at least one identifier calculation function, the name and the payload, wherein the unique name identifier comprise a first hash of the name, and wherein the unique contextual identifier comprises a second hash of the name with at least a portion of the payload.

* * * * *